(12) United States Patent
Lan

(10) Patent No.: US 9,945,521 B2
(45) Date of Patent: Apr. 17, 2018

(54) MANUFACTURING METHOD FOR SUPPORT SUBSTRATE, AND LED DISPLAY DEVICE

(71) Applicant: Beijing Glux Creative Technology Co., Ltd., Beijing (CN)

(72) Inventor: Xia Lan, Beijing (CN)

(73) Assignee: Beijing Glux Creative Technology Co., Ltd., Beijing (CN)

( * ) Notice: Subject to any disclaimer, the term of this patent is extended or adjusted under 35 U.S.C. 154(b) by 434 days.

(21) Appl. No.: 14/408,209

(22) PCT Filed: Apr. 15, 2013

(86) PCT No.: PCT/CN2013/074209
§ 371 (c)(1),
(2) Date: Dec. 15, 2014

(87) PCT Pub. No.: WO2014/000496
PCT Pub. Date: Jan. 3, 2014

(65) Prior Publication Data
US 2015/0131283 A1 May 14, 2015

(30) Foreign Application Priority Data

Jun. 29, 2012 (CN) .......................... 2012 1 0220416

(51) Int. Cl.
*F21K 99/00* (2016.01)
*G09F 9/33* (2006.01)
(Continued)

(52) U.S. Cl.
CPC .............. *F21K 9/30* (2013.01); *B29C 43/183* (2013.01); *F21K 9/20* (2016.08); *F21V 21/00* (2013.01);
(Continued)

(58) Field of Classification Search
CPC ......... B29L 2031/3475; B29K 2307/00; F21K 9/30; F21K 9/20; F21V 21/00; B29C 43/183; G09F 9/33; F21Y 2115/10
(Continued)

(56) References Cited

U.S. PATENT DOCUMENTS

2009/0135583 A1* 5/2009 Hillman ............ G02F 1/133603
362/97.1
2012/0061131 A1 3/2012 Lee et al.
(Continued)

FOREIGN PATENT DOCUMENTS

CN 201355539 12/2009
CN 201438351 4/2010
(Continued)

*Primary Examiner* — Laura Tso
(74) *Attorney, Agent, or Firm* — McDonnell Boehnen Hulbert & Berghoff LLP

(57) ABSTRACT

Disclosed are a manufacturing method for a support substrate (14), and an LED display device. The support substrate (14) is made of a carbon fiber material. The manufacturing method for the support substrate (14) comprises the steps of: S1: preparing a carbon fiber prepreg fabric; S2: preparing a support substrate (14) sheet; S3: pre-forming; and S4: molding. The LED display device comprises at least one cellular LED display screen (1), and the cellular LED display screen (1) comprises a support substrate (14) manufactured using the abovementioned method. The cellular LED display screen (1) comprises an LED display module, the support substrate (14), a control plate and a back cover (16). The LED display module comprises a face guard (11), a lamp plate (12) and a backing plate (13). The support substrate (14) is arranged between the LED display module and the control plate in a sandwich manner; the back cover (16) is connected to the support substrate (14) through studs; and the adjacent cellular LED display screens (1) are assembled by connecting bases (142) and locating pins (143)

(Continued)

arranged at the four corners of the support substrate (14). The LED display device is simple in structure, light and thin, has a strong bearing capacity, and is convenient to install and low in transportation costs.

9 Claims, 6 Drawing Sheets

(51) Int. Cl.
  *B29C 43/18* (2006.01)
  *F21V 21/00* (2006.01)
  *F21K 9/20* (2016.01)
  *B29K 307/00* (2006.01)
  *B29L 31/34* (2006.01)
  *F21Y 115/10* (2016.01)

(52) U.S. Cl.
  CPC ............ *G09F 9/33* (2013.01); *B29K 2307/00* (2013.01); *B29L 2031/3475* (2013.01); *F21Y 2115/10* (2016.08)

(58) Field of Classification Search
  USPC .................................. 362/249.02, 97.3, 97.1
  See application file for complete search history.

(56) References Cited

U.S. PATENT DOCUMENTS

| | | | | |
|---|---|---|---|---|
| 2012/0105764 | A1* | 5/2012 | Yokota | ............ G02F 1/133603 349/61 |
| 2012/0147592 | A1* | 6/2012 | Takase | ............ G02F 1/133608 362/97.1 |
| 2012/0182737 | A1* | 7/2012 | Kuenzler | ............ F21V 29/004 362/249.02 |

FOREIGN PATENT DOCUMENTS

| | | |
|---|---|---|
| CN | 101870176 | 10/2010 |
| CN | 102081885 | 6/2011 |
| CN | 202042137 | 11/2011 |
| CN | 102437278 | 5/2012 |
| CN | 202210387 | 5/2012 |
| CN | 202282127 | 6/2012 |
| CN | 102737554 | 10/2012 |
| JP | 2011138020 | 7/2011 |
| WO | WO 2007/116116 | 10/2007 |

* cited by examiner

MANUFACTURING METHOD FOR SUPPORT SUBSTRATE, AND LED DISPLAY DEVICE

TECHNICAL FIELD

The disclosure relates to the field of LED display, specifically, to an LED display device having good stability, portability and rapid heat dissipation.

BACKGROUND

An LED display device is assembled with a plurality of unit LED display screens, so as to form a LED display device having a suitable size according to customer requirements. Each unit (unit) LED display screen comprises a frame, a lamp plate, a control panel, a power supply, and some connectors. The frame is used to support all components of the unit LED display screen. When assembled with unit LED display device screens, as the assembled LED display device may bear not only the whole gravity loading from an upper unit LED display screen, but also an external force from wind loading and a deformation of the frame caused by temperature changes, etc., the frame is required to have a relatively higher strength and better stability to resist a self-pressure and gravity of the unit LED display screen, a tension caused by wind, and a deformation of the frame caused by temperature changes. The lamp plate is formed with a plurality of LED light-emitting units arranged in a dot-matrix. A driving circuit and a system circuit are also arranged on the lamp plate. A lot of heat may be produced during operation of the LED light-emitting units and circuits. If heat cannot be dissipated in time, it may influence the display effect of the LED light-emitting units, and so cause chromatic aberration of the LED light-emitting units, influence display effect of the LED display device, and decrease the life of LED light-emitting units, thus decrease the life of the LED display device.

From the foregoing, with respect to the unit LED display screen, bearing capability of its frame and heat dissipation are two important problems with the LED display screen. At present, the LED display device is commonly designed as a box (box-shaped design) to bear weight and resist external forces, and a fan is arranged inside the box to solve the problem of heat dissipation. However, the box-shaped design has disadvantages of tedious manufacturing process, bigger noise caused by the fan, large volume, heavy weight and inconvenience in assembly and disassembly. CN Patent ZL200920133332.1 discloses a LED display screen using metal aluminum sheet as a thermal conducting module to conduct the thermal energy from the unit LED display screens and driving circuits to air, and as a frame to support the unit LED display screens. Although the aluminum sheet may produce a good heat dissipation effect to solve heat dissipation of the unit LED display screen, temperature may changes during heat dissipation in various operation environments, the aluminum sheet is prone to deformation and does not have enough stability. In addition, due to high density of metals, a substrate made of a metal is heavy, which may cause difficulty in assembly and transportation. Moreover, heavy metal aluminum sheet leads to large gravity of the unit LED display screen on its own, so that it lacks of bearing capability and strength of resisting external forces when a large LED display device is assembled. Therefore, it is urgent to design an LED display device with simple structure, good thermal conductivity, portability, high strength and good stability.

SUMMARY

In order to overcome the disadvantages of heavy weight and low strength of the LED display device of the prior art due to the metal substrate, one of objections of the disclosure is to provide an LED display device which does not only have a simple and lightweight structure, but has a high compressive strength, a high stability, and a good thermal conductivity.

The technical solutions to the technical problems of the disclosure will be briefly listed as follows.

A method for manufacturing a supporting substrate, comprising the following steps:

S1: preparing a prepreg, comprising:
  preparing a carbon fiber precursor material, knitting it into a carbon fiber fabric, and adding resin and so on into the carbon fiber fabric to form a prepreg;

S2: preparing a supporting substrate sheet, comprising:
  cutting and punching the prepreg, so as to process it into a supporting substrate sheet with a suitable size;

S3: preforming, comprising:
  layer-laying the prepared supporting substrate sheet in a mold;

S4: molding, comprising:
  hot-pressing the layer-designed supporting substrate sheet in the mold.

A LED display device with the foregoing supporting substrate sheet comprises at least one unit LED display screen, and comprises at least one LED display module, a supporting substrate and a control panel. The supporting substrate is arranged between the LED display module and the control panel in a sandwich manner, and is made of carbon fiber material.

Further, the LED display module comprises a cover, a lamp plate and a backing plate which are sequentially arranged. The LED light-emitting units and circuits are arranged on the lamp plate, the LED light-emitting units are arranged in a dot-matrix. The LED display module is fixed on a side of the supporting substrate.

Further, the LED display device also comprises a shield and an X-shaped box. A control panel and a power supply are arranged inside the X-shaped box. The shield is arranged over the X-shaped box, and is fixedly connected to the supporting substrate via bolts and studs arranged in the supporting substrate.

Further, through-holes are arranged in both of the supporting substrate and a backing plate. The X-shaped box with the control panel placed therein is arranged on another side of the supporting substrate opposite to the LED display module. An interface on the control panel is electrically connected to a lamp plate of the LED display module via the through-holes.

Further, reinforcing bosses are arranged around the supporting substrate. The reinforcing bosses are protruded on a side of the supporting substrate towards the shield. The thickness of the reinforcing boss may be between 2 mm and 8 mm.

Further, the thickness of the supporting substrate is between 0.8 mm and 2 mm.

Further, a cross section of the reinforcing boss is trapezoid, rectangular or oval.

Further, connecting bases and locating pins connected to the adjacent unit LED display screen are arranged on the reinforcing bosses at four corners of the supporting substrate.

Further, thermal conducting columns are also arranged on the lamp plate. The thermal conducting columns are exposed in the atmospheric environment by passing through the backing plate and the supporting substrate.

Some of the beneficial effects of the disclosure are: the supporting substrate made of a carbon fiber is applied to the LED display device. Therefore, the LED display device is not only simple in structure and light-weighted, but also has a high compressive strength and high stability. In addition, it is convenient to install and transport the LED display device, and the LED display device has good thermal conductivity.

DETAILED DESCRIPTION OF THE INVENTION

Hereinafter, the disclosure will be further described in combination with the accompanying drawings and exemplary embodiments.

Figure 1:
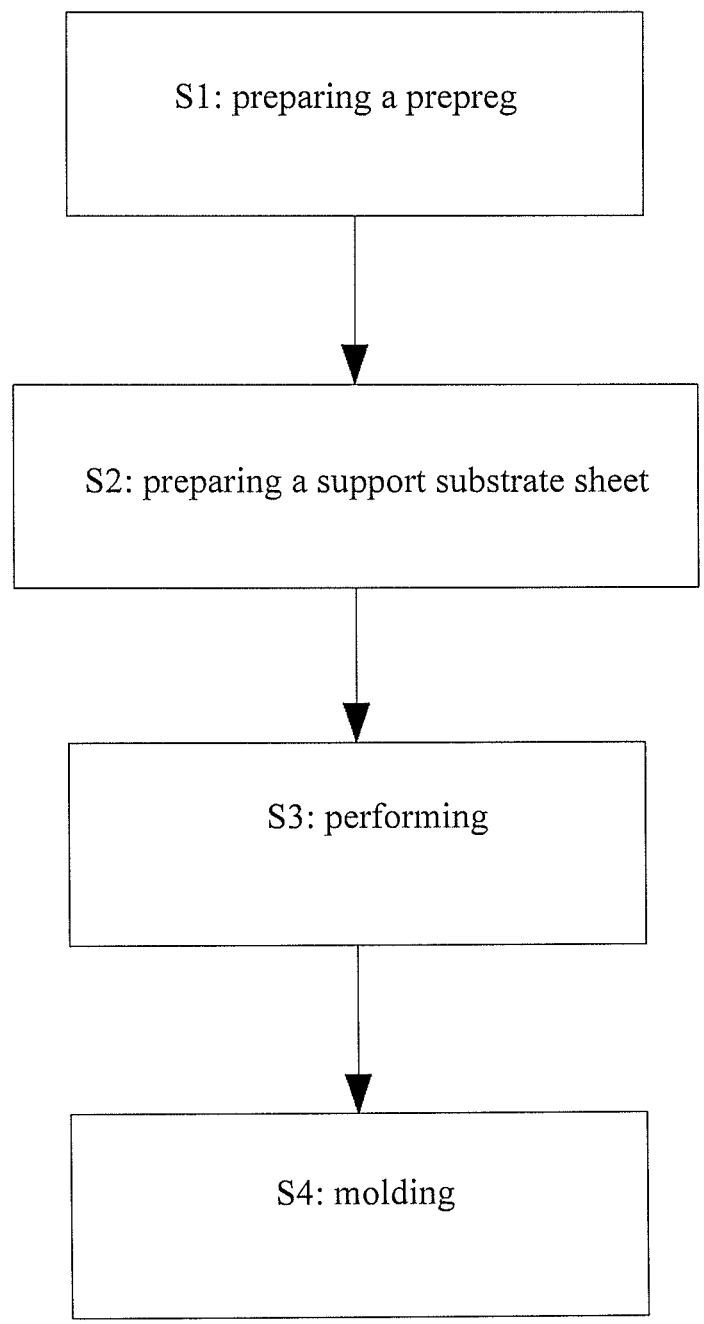
FIG. 1 is a flow chart of preparing an LED supporting substrate provided by the disclosure.

Referring to FIG. 1, a method for manufacturing the supporting substrate provided by the disclosure comprises:
S1: preparing a prepreg, comprising the following steps:
preparing a carbon fiber precursor material, knitting it into a carbon fiber fabric, and adding resin and so on into the carbon fiber fabric to form a prepreg;
wherein the carbon fiber precursor material and quantification of the added materials may be selected, e.g., suitable precursor and adding amount of materials such as resin may be selected as desired, i.e. according to strength and modulus of the product, so as to form a prepreg with different characteristics.
S2: preparing a supporting substrate sheet, comprising the following steps:
cutting and punching the prepreg, so as to process it into a supporting substrate sheet with a suitable size; and
cutting the prepared prepreg according to the size of the supporting substrate, and punching the prepared prepreg at positions of reserved through-holes.
S3: performing, comprising the following steps:
layer-designing the prepared supporting substrate sheet in the mold; and
laying the supporting substrate sheet cut in step S2 layer by layer in a mold, wherein a plurality of layers of the supporting substrate sheets with the size of a reinforcing boss may be laid at positions of the reinforcing bosses, wherein partial thickened fillers may also be laid at centers of the reinforcing bosses.
S4: molding, comprising the following steps:
hot-pressing the layer-designed and laid supporting substrate sheet in the mold, so as to manufacture a supporting substrate;
in hot-pressing the supporting substrate sheet layered and laid in step S3 at a high temperature, the temperature may be selected according to characteristics of the product.

Figure 2:
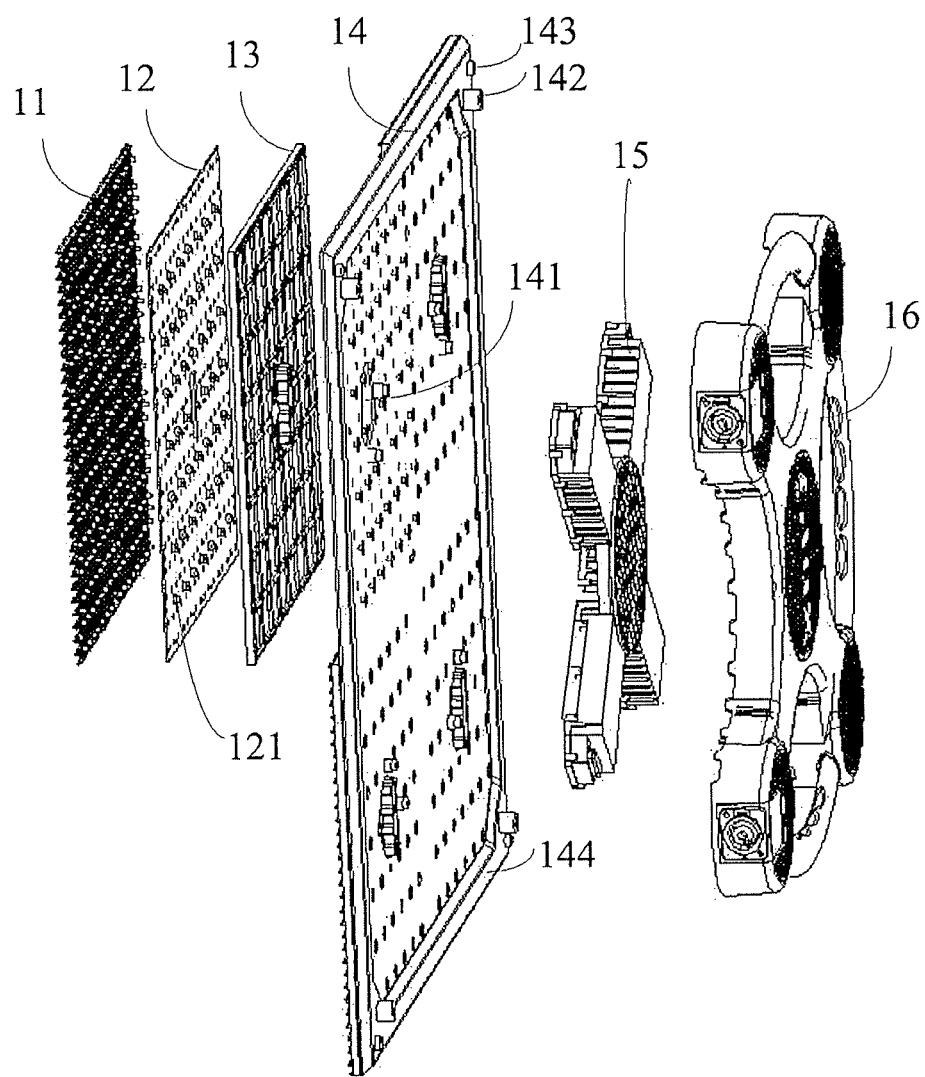
FIG. 2 is a structural schematic view of a unit LED display screen provided by the disclosure.
Figure 3:
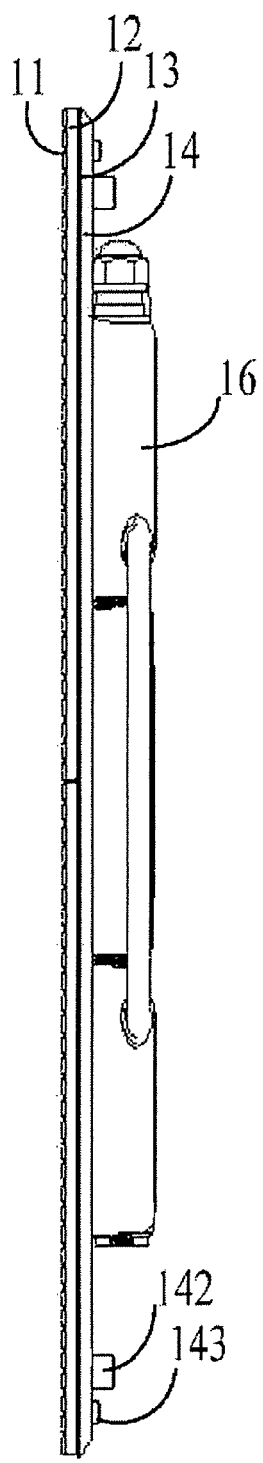
FIG. 3 is a lateral view of the unit LED display screen
Figure 4:
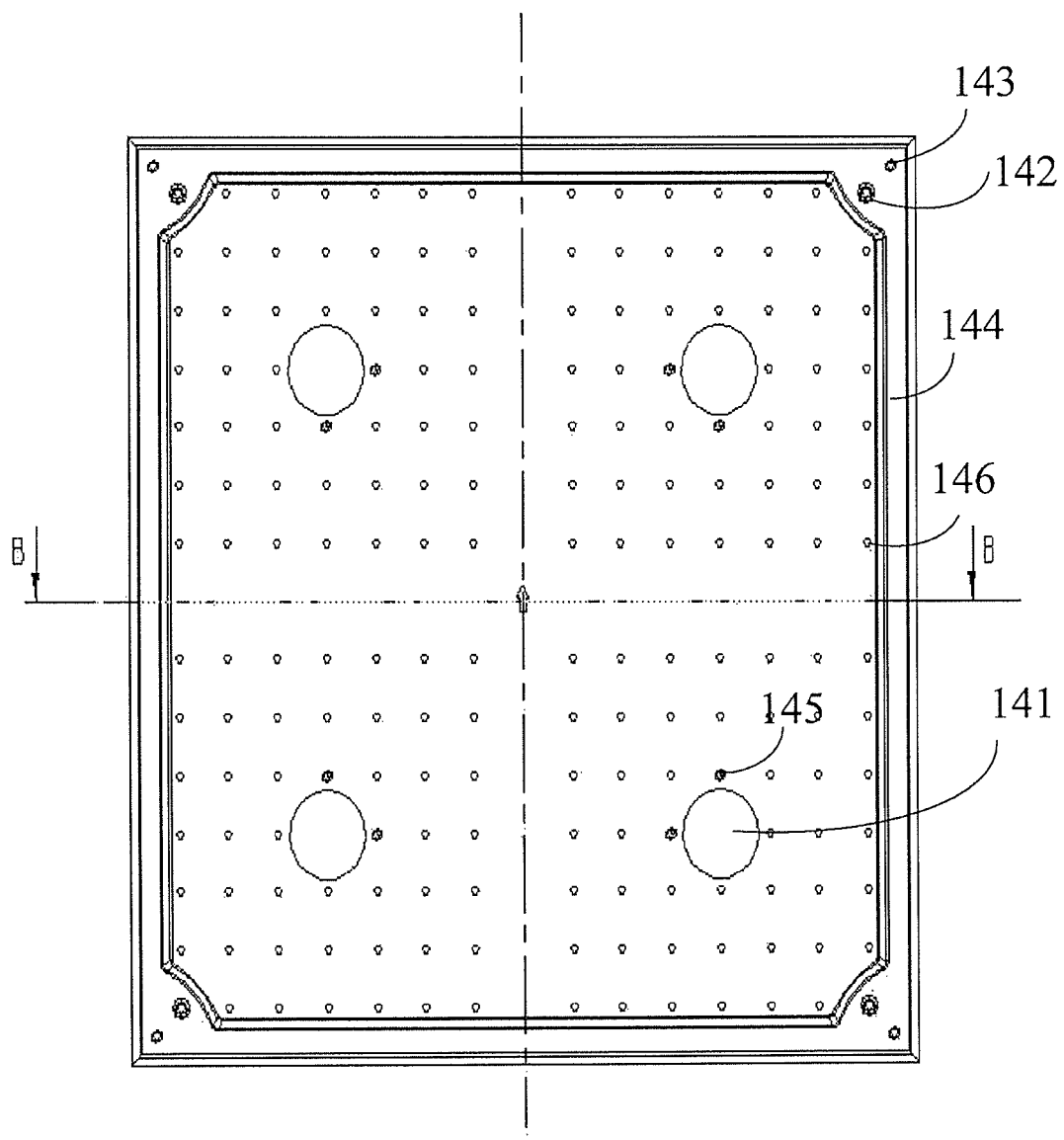
FIG. 4 is a structure view of a supporting substrate provided by the disclosure.
Figure 5:
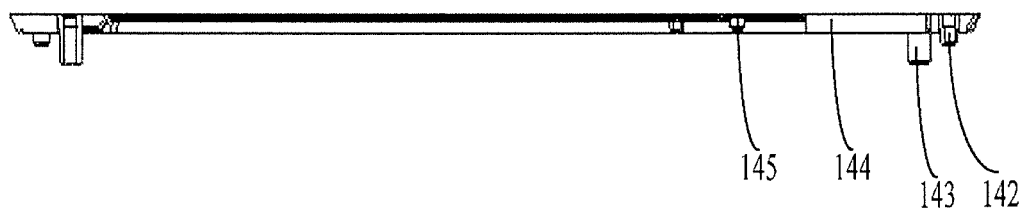
FIG. 5 is a cross-sectional view taken along line B-B on FIG. 3.
Figure 6:
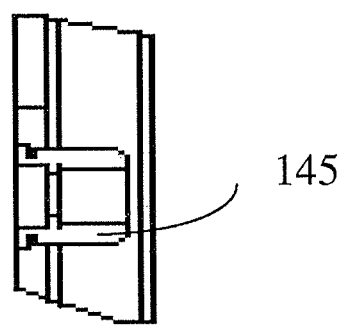
FIG. 6 is a structure view of a connecting stud connected to a shield on the supporting substrate provided by the disclosure.
Figure 7:
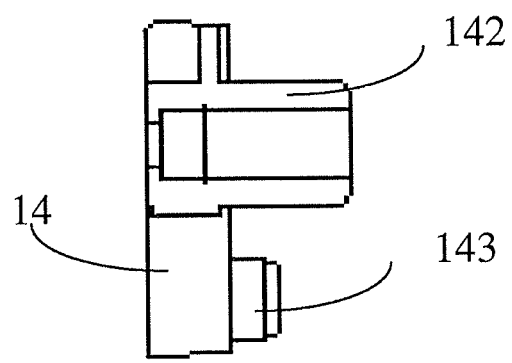
FIG. 7 is a structure view of connecting bases and locating pins connected to the adjacent unit LED display screens on the supporting substrate provided by the disclosure.

Referring to FIGS. 2 and 3, a unit LED display screen 1 is provided by the present embodiment. The unit LED display screen 1 comprises a covercover 11, a lamp plate 12, a pad 13, a supporting substrate 14, a control panel (not shown) and a shield 16, and the cover, the lamp plate. The backing plate, the supporting substrate, the control panel and the shield are sequentially arranged. Each unit LED display screen 1 comprises four LED display modules. Each LED display module comprises a cover 11, a lamp plate 12 and a backing plate 13. The cover 11 is arranged over the top of the lamp plate 12. The LED light-emitting units, circuits and chips are arranged on the lamp plate 12. The LED light-emitting units are arranged in a dot-matrix on a side of the lamp plate 12 towards the cover 11. The cover 11 is arranged over the top of the lamp plate 12 at a side of the LED light-emitting units, and transparent holes are arranged on the cover 11 at positions corresponding to the LED light-emitting units. Chips are arranged on the lamp plate 12 at the opposite side of the cover, while the backing plate 13 is adhered to the lamp plate 12 on the same side of the chips. A plurality of though holes are arranged in the backing plate 13 for receiving the chips which are arranged on the side of the lamp plate 12 towards the backing plate and raised on the lamp plate. The LED display module is formed by sequentially stacking the cover 11, the lamp plate 12 and the backing plate 13. The LED display module is fixed on the supporting substrate 14.

The supporting substrate 14 is arranged between the backing plate 13 and an X-shaped box 15 for placing the control panel in a sandwich manner. The control panel is placed inside the X-shaped box 15. A power supply may also be arranged inside the X-shaped box 15. The X-shaped box 15 is fixed on the supporting substrate via bolts. The shield 16 is buckled on the X-shaped box and fixedly connected to the supporting substrate 14. The supporting substrate 14 is used to support the LED display module formed by the cover 11, the lamp plate 12 and the backing plate 13, the X-shaped box for placing the control panel and the power supply, and the shield 16. The supporting substrate 14 bears the pressure of the whole unit LED display screen 1.

A through-hole 141 is arranged in the supporting substrate 14. A through-hole 131 corresponding to the through-hole 141 is also arranged in the backing plate 13 at a position corresponding to the through-hole 141. The interface on the control panel placed inside the X-shaped box 15 is electrically connected to the lamp plate 12 via the through-holes 141 and 131.

Studs 145 are arranged on the supporting substrate 14. The shield 16 is arranged on the control panel, and is fixedly connected to the supporting substrate 14 via bolts and the studs 145 arranged on the supporting substrate 14. The power supply is arranged inside the X-shaped box and connected to the control panel for supplying electric power to the lamp plate 12 and the control panel. A handle may also be arranged on the shield 16 for holding during installation and transportation.

Reinforcing bosses 144 are arranged around the supporting substrate 14. Connecting bases 142 and locating pins 143 connected to the adjacent unit LED display screen are arranged on the reinforcing bosses 144 at four corners of the supporting substrate 14.

The LED light-emitting units and circuits are arranged on the lamp plate 12. The LED light-emitting units are arranged in a dot-matrix. Thermal energy, which may be produced by the LED light-emitting units during operation, is conducted to the lamp plate 12 with a uniform distribution. The backing plate 13 is adhered to the lamp plate 12 by pouring a thermal-conductive material into the through-hole of the backing plate 13, and is adhered to the side of the supporting substrate 14 towards the lamp plate with, so that the thermal energy of the lamp plate 12 is conducted to the supporting substrate 14. The thermal energy is conducted to the atmospheric environment with thermal conductivity of the supporting substrate 14, so as to achieve heat dissipation of the LED display screen.

The LED display device is assembled by overlying at least one unit LED display screen 1. As the supporting substrate 14 bears not only self-pressure, but gravity of the upper unit LED display screens, the supporting substrate 14 is preferably made of materials with high strength. Further, a lot of thermal energy may be produced by LED light-emitting units during operation, and the thermal energy may be conducted to the supporting substrate and further conducted to the atmospheric environment via the supporting substrate. The temperature of the supporting substrate may be changed due to the thermal energy conducted to the supporting substrate 14. Therefore, the supporting substrate 14 is preferably made of materials with good thermal conductivity and not easily deformation in the high temperature. In addition, the LED display device is assembled by a plurality of unit LED display screens. The LED display device with a large size may be assembled on the heights, thus bulky unit LED display screens will cause trouble for operation and transportation of the personnel. In conclusion, materials with high strength, high stability and light self-weight will be considered preferred in selecting the material of the supporting substrate.

The higher the specific strength of the material is, the lighter the self-weight of the component will be. The higher the specific modulus is, the higher the rigidity of the component will be. The specific strength is a radio of the strength and density of the materials. Preferably, the supporting substrate is made of carbon fiber material. Carbon fiber material is a new material with good mechanical properties. The specific weight of the carbon fiber material is less than a quarter of that of steel. The tensile strength of carbon fiber material is generally more than 3500 Mpa, while the tensile strength of steel is about 500 Mpa, thus tensile strength of the carbon fiber material is 7-9 times that of steel. Tensile elastic strength of carbon fiber material, being 230-430 Gpa, is higher than that of steel. Specific strength of the carbon fiber material may reach more than 2000 Mpa/g/cm$^3$, while that of steel is 59 Mpa/g/cm3. The specific modulus of carbon fiber material, being 130 Mpa/g/cm3, is higher than that of steel, too.

The thickness of the supporting substrate 14 may be no less than 0.8 mm, and no more than 2 mm, or the thickness of the supporting substrate 14 may be selected between 0.8 mm and 2 mm. Referring to FIGS. 4-7, the through-holes 141 are arranged in the supporting substrate 14 for connecting the interface of the control panel to the lamp plate. The studs 145 are arranged on an outer side the through-holes 141 for fixing the shield 16 on the supporting substrate 14.

In addition, the reinforcing bosses 144 are arranged around the supporting substrate, and for reinforcing the strength of the supporting substrate 14, the thickness of the reinforcing bosses 144 may be no less than 4 mm, and no more than 6 mm, moreover, the thickness of the reinforcing bosses 144 may be selected from 4-6 mm. The cross section of the reinforcing boss 144 may be arranged as trapezoid, rectangular or oval. In the present embodiment, preferably, the cross section of the reinforcing boss is arranged as trapezoid. Connecting bases 142 and locating pins 143 connected to the adjacent unit LED display screen are arranged on the reinforcing bosses 144 at the four corners of the supporting substrate 14.

In order to further reinforce heat dissipation of the LED display screen, another embodiment is provided in the disclosure. On the basis of the embodiment above, as shown in FIG. 2, thermal conducting columns 121 are arranged on the lamp plate 12. The thermal conducting columns 121 are made of materials with high thermal conductivity. The material of the thermal conducting columns 121 may be selected from steel, aluminum, or the like. Correspondingly, the through-holes 146 are punched in the supporting substrate 14 compatible to the thermal conducting column 121. The thermal conducting column 121 is exposed in the atmospheric environment by passing through the through-hole 146 in the supporting substrate 14, enabling the thermal energy produced by the lamp plate to be rapidly conducted to the supporting substrate and the atmospheric environment, so that the thermal energy can be conducted rapidly, and the lives of the LED light-emitting units and chips can be lengthened accordingly.

Main index for evaluating the LED display device is the improvements of heat dissipation and bearing capacity in the structural design of the LED display device. Through the design of a plate-type supporting substrate, functions of heat dissipation and bearing are gathered on the supporting substrate in the disclosure, so that the bulkiness of the box-shaped LED display device is completely improved, thus the LED display screen can be simple and light in structure. In addition, the supporting substrate is made of carbon fiber material, so, with the characteristics of the carbon fiber material such as high specific strength, high specific modulus, light-weighting, high heat resistance, high thermal conductivity, high stability, and the like, not only the problem of heat dissipation can be solved, but the weight of the LED display screen can be reduced, meanwhile, the bearing capacity of the LED display screen can be improved, thereby increasing applicability of the LED display device, making convenience in assembly and disassembly and decreasing transportation costs.

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments. Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A unit LED display screen comprising at least one LED display module, a supporting substrate, and a control panel, wherein the supporting substrate is arranged between the LED display module and the control panel in a sandwich manner for supporting a LED display device, and the supporting substrate is made of carbon fiber material wherein the LED display device further comprises a shield and an X-shaped box, a control panel and a power supply are arranged inside the X-shaped box, and the shield is arranged over the X-shaped box and fixedly connected to the supporting substrate.

2. The LED display screen according to claim 1, wherein the LED display module comprises a cover, a lamp plate and a backing plate which are sequentially arranged, LED light-emitting units and circuits are arranged on the lamp plate, the LED light-emitting units are arranged in a dot-matrix; and the LED display module is fixed on a side of the supporting substrate.

3. The LED display screen according to claim 1, wherein through-holes are arranged in both of the supporting substrate and a backing plate, the X-shaped box with the control panel placed therein is arranged on another side of the supporting substrate opposite to the LED display module, and an interface on the control panel is electrically connected to a lamp plate of the LED display module via the through-holes.

4. The LED display screen according to claim 3, wherein reinforcing bosses are arranged around the supporting substrate, and protruded on a side of the supporting substrate towards the shield for reinforcing the strength of the substrate.

5. The LED display screen according to claim 1, wherein a thickness of the supporting substrate is between 0.8 mm and 2 mm.

6. The LED display screen according to claim 4, wherein a thickness of the reinforcing boss is between 2 mm and 8 mm.

7. The LED display screen according to claim 6, wherein a cross section of the reinforcing boss is trapezoid, rectangular or oval.

8. An LED display device comprising at least one unit LED display screen according to claim 1.

9. A method for manufacturing the supporting substrate according to claim 1, comprising the following steps:
S1: preparing a prepreg, comprising:
preparing a carbon fiber precursor material, and knitting it into a carbon fiber fabric, then adding resin into the carbon fiber fabric to form a prepreg;
S2, preparing a supporting substrate sheet, comprising:
cutting and punching the prepreg, so as to process it into a supporting substrate sheet with a suitable size;
S3: performing, comprising:
layer-designing the prepared supporting substrate sheet in a mold;
S4: molding, comprising:
hot-pressing the layer-designed supporting substrate sheet in the mold.

* * * * *